(12) United States Patent
Gula et al.

(10) Patent No.: US 7,761,918 B2
(45) Date of Patent: Jul. 20, 2010

(54) SYSTEM AND METHOD FOR SCANNING A NETWORK

(75) Inventors: Ronald Joseph Gula, Marriotsville, MD (US); Renaud Marie Maurice Deraison, Columbia, MD (US); Matthew Todd Hayton, Silver Spring, MD (US)

(73) Assignee: Tenable Network Security, Inc., Columbia, MD (US)

( * ) Notice: Subject to any disclaimer, the term of this patent is extended or adjusted under 35 U.S.C. 154(b) by 1111 days.

(21) Appl. No.: 11/016,761

(22) Filed: Dec. 21, 2004

(65) Prior Publication Data

US 2005/0229255 A1      Oct. 13, 2005

Related U.S. Application Data

(60) Provisional application No. 60/561,515, filed on Apr. 13, 2004.

(51) Int. Cl.
H04L 9/00 (2006.01)

(52) U.S. Cl. .................... 726/23; 726/1; 726/14; 726/22; 726/24; 726/25; 726/26; 709/223; 709/224; 709/225

(58) Field of Classification Search .............. 726/1, 726/23, 25, 26; 709/223, 224, 225; 705/51, 705/79
See application file for complete search history.

(56) References Cited

U.S. PATENT DOCUMENTS

| 4,525,599 | A | 6/1985 | Curran et al. ............ 178/22.08 |
|---|---|---|---|
| 5,541,997 | A | 7/1996 | Pappas et al. ................. 380/49 |
| 5,715,391 | A | 2/1998 | Jackson et al. ......... 395/200.01 |
| 5,721,819 | A | 2/1998 | Galles et al. ........... 395/200.15 |
| 5,838,919 | A | 11/1998 | Schwaller et al. ....... 395/200.54 |
| 5,844,817 | A | 12/1998 | Lobley et al. ............... 364/578 |
| 6,154,775 | A | 11/2000 | Coss et al. ................... 709/225 |
| 6,324,656 | B1 * | 11/2001 | Gleichauf et al. ............. 714/37 |
| 6,393,568 | B1 | 5/2002 | Ranger et al. ............... 713/188 |
| 6,415,321 | B1 * | 7/2002 | Gleichauf et al. ........... 709/224 |
| 6,487,666 | B1 * | 11/2002 | Shanklin et al. ............... 726/23 |
| 6,499,107 | B1 * | 12/2002 | Gleichauf et al. ............. 726/23 |
| 6,510,509 | B1 | 1/2003 | Chopra et al. ................. 712/13 |
| 6,606,663 | B1 | 8/2003 | Liao et al. .................... 709/229 |

(Continued)

OTHER PUBLICATIONS

John Wack et al, NIST SP 800-42 Guideline on Network Security Testing, pp. 1-92, Computer Computer Security Division, NIST, Oct. 2003.*

(Continued)

*Primary Examiner*—Nasser Moazzami
*Assistant Examiner*—Shanto M Abedin
(74) *Attorney, Agent, or Firm*—Pillsbury Winthrop Shaw Pittman LLP

(57) ABSTRACT

Systems and methods to passively scan a network are disclosed herein. The passive scanner sniffs a plurality of packets traveling across the network. The passive scanner analyzes information from the sniffed packets to build a topology of network devices and services that are active on the network. In addition, the passive scanner analyzes the information to detect vulnerabilities in network devices and services. Finally, the passive scanner prepares a report containing the detected vulnerabilities and the topology when it observes a minimum number of sessions. Because the passive scanner operates passively, it may operate continuously without burdening the network. Similarly, it also may obtain information regarding client-side and server side vulnerabilities.

27 Claims, 14 Drawing Sheets

U.S. PATENT DOCUMENTS

| | | | |
|---|---|---|---|
| 6,704,874 B1* | 3/2004 | Porras et al. | 726/22 |
| 6,789,202 B1* | 9/2004 | Ko et al. | 726/23 |
| 6,873,617 B1 | 3/2005 | Karras | 370/389 |
| 6,882,728 B1 | 4/2005 | Takahashi et al. | 380/201 |
| 6,886,020 B1 | 4/2005 | Zahavi et al. | 707/204 |
| 6,952,779 B1* | 10/2005 | Cohen et al. | 726/22 |
| 6,957,348 B1 | 10/2005 | Flowers et al. | 713/201 |
| 6,968,377 B1* | 11/2005 | Gleichauf et al. | 709/224 |
| 7,017,186 B2* | 3/2006 | Day | 726/23 |
| 7,073,198 B1* | 7/2006 | Flowers et al. | 726/25 |
| 7,093,287 B1 | 8/2006 | Gusler et al. | 726/13 |
| 7,120,148 B1 | 10/2006 | Batz et al. | 370/392 |
| 7,134,141 B2 | 11/2006 | Crosbie et al. | 726/23 |
| 7,139,819 B1 | 11/2006 | Luo et al. | 709/223 |
| 7,162,742 B1 | 1/2007 | Flowers et al. | 726/25 |
| 7,181,769 B1 | 2/2007 | Keanini et al. | 726/23 |
| 7,237,264 B1* | 6/2007 | Graham et al. | 726/23 |
| 7,243,366 B2 | 7/2007 | Medvinsky et al. | 726/2 |
| 7,290,145 B2 | 10/2007 | Falkenthros | 713/182 |
| 7,324,551 B1 | 1/2008 | Stammers | 370/468 |
| 7,509,681 B2 | 3/2009 | Flowers et al. | 726/25 |
| 7,594,273 B2 | 9/2009 | Keanini et al. | 726/25 |
| 2001/0034847 A1* | 10/2001 | Gaul, Jr. | 713/201 |
| 2002/0019945 A1 | 2/2002 | Houston et al. | 713/201 |
| 2002/0100023 A1 | 7/2002 | Ueki et al. | 717/127 |
| 2002/0107841 A1 | 8/2002 | Hellerstein et al. | 707/3 |
| 2002/0166063 A1* | 11/2002 | Lachman et al. | 713/200 |
| 2003/0051026 A1 | 3/2003 | Carter et al. | 709/224 |
| 2003/0135517 A1 | 7/2003 | Kauffman | 707/103 R |
| 2003/0145225 A1 | 7/2003 | Bruton, III et al. | 713/201 |
| 2003/0196123 A1* | 10/2003 | Rowland et al. | 713/201 |
| 2004/0003266 A1 | 1/2004 | Moshir et al. | 713/191 |
| 2004/0015719 A1 | 1/2004 | Lee et al. | 713/201 |
| 2004/0042470 A1 | 3/2004 | Cooper et al. | 370/401 |
| 2005/0068928 A1* | 3/2005 | Smith et al. | 370/338 |
| 2005/0108578 A1 | 5/2005 | Tajalli et al. | 713/201 |
| 2005/0128988 A1* | 6/2005 | Simpson et al. | 370/338 |
| 2005/0188419 A1 | 8/2005 | Dadhia et al. | 726/1 |
| 2005/0203886 A1 | 9/2005 | Wong | 707/3 |
| 2005/0203921 A1 | 9/2005 | Newman et al. | 707/100 |
| 2006/0010245 A1 | 1/2006 | Carnahan | 709/231 |
| 2006/0018466 A1 | 1/2006 | Adelstein et al. | 380/46 |
| 2006/0117091 A1 | 6/2006 | Justin | 709/217 |
| 2007/0169190 A1 | 7/2007 | Kolton et al. | 726/22 |
| 2007/0277238 A1 | 11/2007 | Margalit et al. | 726/22 |
| 2008/0047009 A1 | 2/2008 | Overcash et al. | 726/23 |

OTHER PUBLICATIONS

Renaud Deraison et al, Passive Vulnerability Scanning Introduction to NeVO, pp. 1-13, Tenable Network Security, Aug. 2003.*

Deraison, Renaud, et al., "Unified Security Monitoring (USM); Real-Time Situational Awareness of Network Vulnerabilities, Events and Configurations", Revision 2, Tenable Network Security, Jan. 27, 2009, 12 pages.

Zhang, Yin, et al., "Detecting Backdoors", *Proceedings of the 9th USENIX Security Symposium*, Denver, Colorado, Aug. 2000, 11 pages.

"Basic Cryptanalysis", Department of the Army, Field Manual No. 34-40-2, Sep. 13, 1990, 363 pages.

* cited by examiner

VIEW CUMULATIVE VULNERABILITIES

| Query Tool: | Matching CIDR: | Matching Ports: | Vulnerabilities: | Recommendations: | Protocol: | Severity: | Matching Text: |
|---|---|---|---|---|---|---|---|
| Count matching IP addresses ⌄ | | | | ☐With ☐Without | none ⌄ | none ⌄ | |

| | Asset Filter: | Asset Type: | Asset Place: | Asset Description: | View by: | | |
|---|---|---|---|---|---|---|---|
| | ☐Exact Match | no type ⌄ | no place ⌄ | no description ⌄ | IP address ⌄ | | |

☐ Clear

False Pos.
☐ Only

Vulnerability Detection:
☐ No Passive ☐ No Active

800

11389 matching IP addresses

FIG. 8

VIEW CUMULATIVE VULNERABILITIES

| Query Tool: | Matching CIDR: | Matching Ports: | Vulnerabilities: | Recommendations: | Protocol: | Severity: | Matching Text: |
|---|---|---|---|---|---|---|---|
| List of operating systems ▼ | | | | ☐ With ☐ Without | none ▼ | none ▼ | |

Vulnerability Detection: ☐ No Passive ☐ No Active  
Asset Filter: ☐ Exact Match  Asset Type: no type ▼  Asset Place: no place ▼  Asset Description: no description ▼  View by: IP address ▼

Actively Detected ~1010

| Count | Operating System |
|---|---|

Passively Detected ~1020

| Count | Operating System |
|---|---|
| 2888 | Microsoft Windows 2000 Server Service Pack 4<br>Microsoft Windows XP Home Edition Service Pack 1<br>Microsoft Windows XP Home Edition<br>Microsoft Windows 2000 Server |
| 1761 | Microsoft Windows XP Home Edition Service Pack 1<br>Microsoft Windows XP Home Edition<br>Microsoft Windows 2000 Server |
| 1380 | Microsoft Windows XP Professional Service Pack 1<br>Microsoft Windows 2000 Server Service Pack 3<br>Microsoft Windows XP Home Edition<br>Microsoft Windows 2000 Server |
| 143 | FreeBSD 4.7<br>FreeBSD 4.8<br>FreeBSD 4.9<br>FreeBSD 5.0<br>FreeBSD 5.1<br>MacOS X |
| 126 | UNKNOWN |

FIG. 10

```
id=1000001
nid=11414
hs_sport=143
name=IMAP Banner
description=An IMAP server is running on this port. Its banner is :<br>
%L
risk=NONE
match=OK
match=IMAP
match=server ready
regex=^.*OK.*IMAP.*server ready
```

FIG. 12

```
id=800001
name=Password file obtained by HTTP (GET)
family=Generic
sport=80
description=It seems that a Unix password file was sent by the remote
web server when the following request was made :<br>%P<br>We saw :
<br>%L</br>
pmatch=>GET /
pmatch=HTTP/1.
match=root
match=daemon
match=bin
regex=root:.*:0:0:.*:.*
```

FIG. 13

```

# SNMPv1 response

# Matches on the following:

# 0x30                    - ASN.1 header
# 0x02 0x01 0x00          - (integer) (byte length) (SNMP version - 1)
# 0x04 0x06 public        - (string) (byte length) (community string - "public")
# 0xa2                    - message type - RESPONSE
# 0x02 0x01 0x00          - (integer) (byte length) (error status - 0)
# 0x02 0x01 0x00          - (integer) (byte length) (error index - 0)

id=1400000
udp
sport=161
name=SNMP public community string
description=The remote host is running an SNMPv1 server that uses a well-known community string - public
bmatch=>0:30
bmatch=>2:020100
bmatch=>5:0406707562c6963a2
bmatch=020100020100
```

FIG. 14

```
id=700018
nooutput
hs_sport=21
name=Anonymous FTP (login: ftp)
pmatch=^USER ftp
match=^331
NEXT #------------------------------
id=700019
dependency=700018
timed-dependency=5
hs_sport=21
name=Anonymous FTP enabled
description=The remote FTP server has anonymous access enabled.
risk=LOW
pmatch=^PASS
match=^230
```

FIG. 15

SYSTEM AND METHOD FOR SCANNING A NETWORK

This application claims the benefit of U.S. Provisional Application No. 60/561,515, filed Apr. 13, 2004, which is herein incorporated by reference in its entirety.

BACKGROUND

1. Field of the Invention

The present invention relates generally to network security and, more particularly, to analyzing a network for vulnerabilities.

2. Background of the Invention

A network vulnerability may be used by an illegal user to gain or deny access to an unauthorized system. To detect (and remedy) such vulnerabilities, a vulnerability analysis typically is conducted either by manual inspection or by a network scanner. Although both methods are slow, manual inspection is particularly slow. Conventional network scanners (herein called "active scanners") operate by interrogating a network. The active scanner sends packets or communicates in some manner with the systems it is auditing. Accordingly, the active scanner is bound by the physical limitations of the networks and system it is auditing to send and receive these packets. Because of these physical limitations, scanning can take a long time.

FIG. 1 is a schematic diagram of a conventional active scanning system. System 100 includes multiple routers 130, hosts or network devices 120 and a single active scanner 110. In the network of system 100, scanner 110, which is placed in one network subnet, must perform a considerable amount of work. Active scanner 110 sends packets across several routers 130 and scans for various potential hosts 120 which may or may not be active. If any of routers 120 is performing firewall screening, the scan's results will be non-comprehensive, because the scan will be unable to scan behind the firewall.

In addition, active scanners suffer other shortcomings. First, an active scan's results become stale over time. Even if someone can launch an active scan once a day, there still may be new hosts added or removed during that day. Most organizations only scan once a week or month, and the results of their active scan become less valuable over time as network changes occur.

Further, an active scan may inadvertently disrupt a system it is testing. For example, the act of probing in some rare cases may cause instability in the audited system. Network devices such as routers and switches may also be affected by the large number of port scans, host enumeration and vulnerability testing. Even if there is no disruption, it will cause a firewall or tested server to generate many log files.

Finally, in addition to the technical limits of active scanners, active scanners also may have a political stigma within large organizations. For example, a system administrator may feel that there is no need for a third party to scan his systems.

Thus, there is a need for improved methods of quickly and continuously scanning a network for vulnerabilities.

BRIEF SUMMARY OF THE INVENTION

A method for passively scanning a network according to an embodiment of the invention includes sniffing a plurality of packets traveling across the network. Information from the plurality of packets is extracted to build a topology of network devices and services that are active on the network. The plurality of packets are analyzed to detect vulnerabilities in network devices and services. The passive scanner prepares a report containing the detected vulnerabilities and the topology.

A method for detecting vulnerabilities in a network according to an embodiment of the invention includes distributing a plurality of active vulnerability scanners across a network and distributing a plurality of passive vulnerability scanners across the network. The network is scanned with the plurality of active vulnerability scanners at a first instance, wherein each of the plurality of active vulnerability scanner scans a portion of the network. The network is scanned with the plurality of active vulnerability scanners at a second instance after the first instance, wherein each of the plurality of active vulnerability scanner scans a portion of the network. The network also is scanned with the plurality of passive vulnerability scanners for a continuous interval between the first instance and the second instance, wherein each of the plurality of passive vulnerability scanners scans a portion of the network. Scanned results from each of the plurality of active and passive vulnerability scanners are forwarded to a centralized vulnerability management system.

BRIEF DESCRIPTION OF THE DRAWINGS

FIG. 8 is a screen shot of unique IP addresses detected by a single passive scanner according to a preferred embodiment of the present invention.

FIG. 10 is a screen shot of operating systems detected by the passive scanner according to a preferred embodiment of the present invention.

FIG. 12 is a basic exemplary signature analyzed by a passive scanner according to a preferred embodiment of the present invention.

FIG. 13 is an exemplary signature for analyzing previous packets by a passive scanner according to a preferred embodiment of the present invention.

FIG. 14 is an exemplary signature for analyzing binary patterns by a passive scanner according to a preferred embodiment of the present invention.

FIG. 15 is a signature for analyzing time-dependent patterns by a passive scanner according to a preferred embodiment of the present invention.

DESCRIPTION OF THE INVENTION

The present invention provides a passive network scanner for creating a network model of active hosts and services on a network and analyzing vulnerabilities in the client and/or server machines or applications it observes. The scanner in real-time continuously looks for ports and hosts which may indicate change on a network, as well as new vulnerabilities. When a network model update or vulnerability is observed, it may be reported immediately or on another periodic basis requested by a user.

Figure 2:
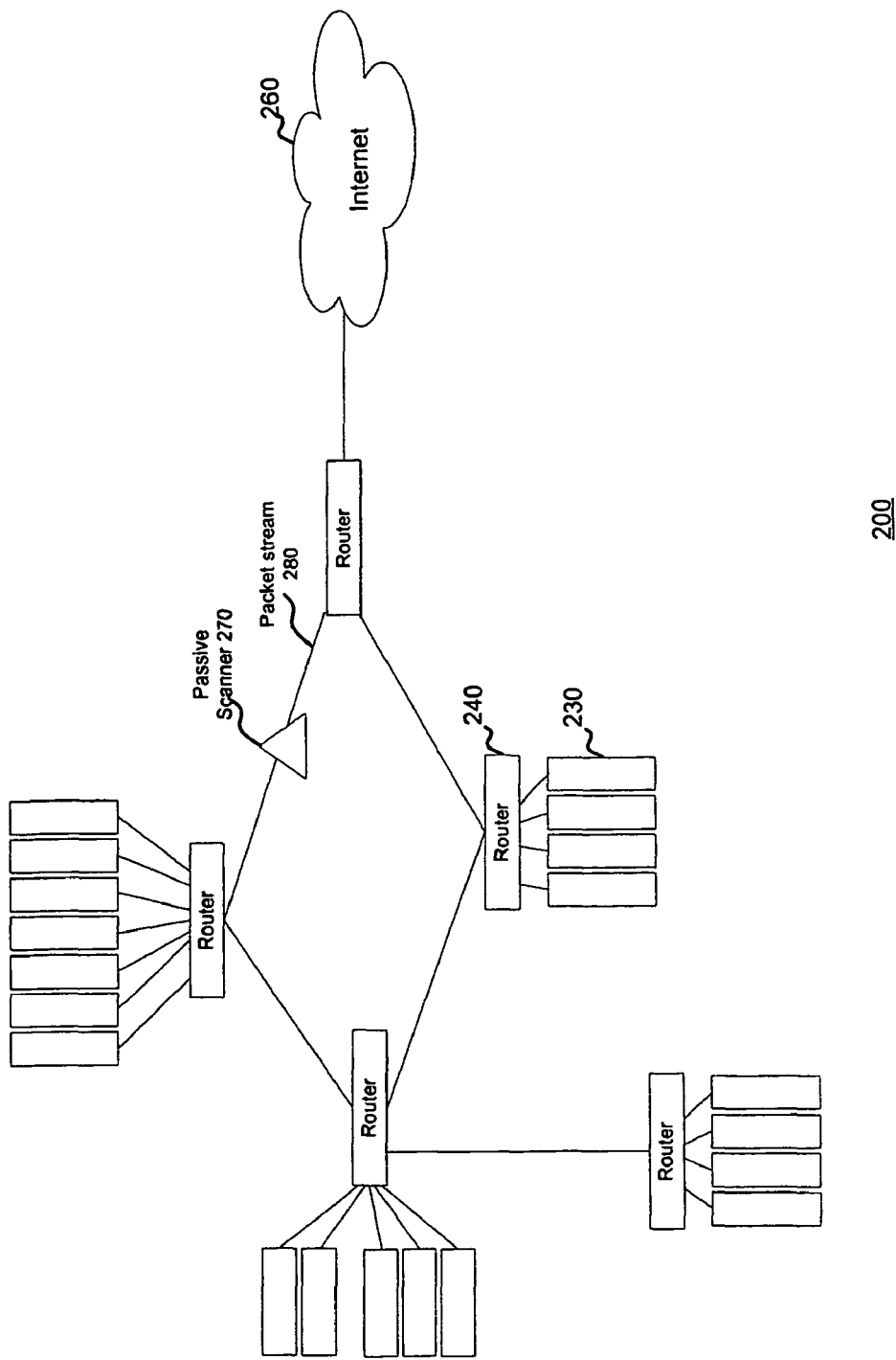
FIG. 2 is a schematic diagram of a network using a passive scanner according to a first preferred embodiment of the present invention.

FIG. 2 is a schematic diagram of a network using a passive scanner according to a first preferred embodiment of the present invention. System 200 includes a host 230, a router 240, Internet 260, a passive scanner 270 and a packet stream 280.

In a preferred embodiment of the invention, passive scanner 270 comprises a piece of software loaded onto a laptop, computer system or server. To perform effectively, passive scanner 270 must see as many network sessions as possible for the network it is monitoring. That is, it must have good network visibility. Thus, passive scanner 270 can be deployed on a network hub, a spanned port of a switch, off a network tap, at a network choke point, a dial up node, behind a firewall and at server farms. In some cases, it may make sense to deploy it directly on or alongside a pre-existing network intrusion detection system ("NIDS"), shown and discussed below in reference to FIG. 5, such as Snort (http://www.snort.org) or a packet analyzer. Some exemplary servers suitable for running the software module for the passive scanner include Redhat 7,8 or 9 or FreeBSD 4.x.

Unlike an active scanner which sends packets to illicit a response from a host or server, passive scanner 270 passively listens or "sniffs" network packets in packet stream 280.

From the sniffed packets, passive scanner 270 reconstructs network sessions to create a network model or topology of each host 230 that is active together with its active services. Further, passive scanner 270 applies "signatures" to the traffic in such a way that the presence of vulnerabilities can be determined. This network model of active hosts, services and vulnerabilities is automatically produced by passive scanner 270 on a configurable and periodic basis. Alternatively, or in addition thereto, the network model may be updated immediately upon the detection of a new active host 230 or a new service of host 230.

Although the specification describes the passive vulnerability scanners herein as software modules, one of ordinary skill in the art will recognize that the scanner may also comprise a black box connected to the network.

Figure 3:
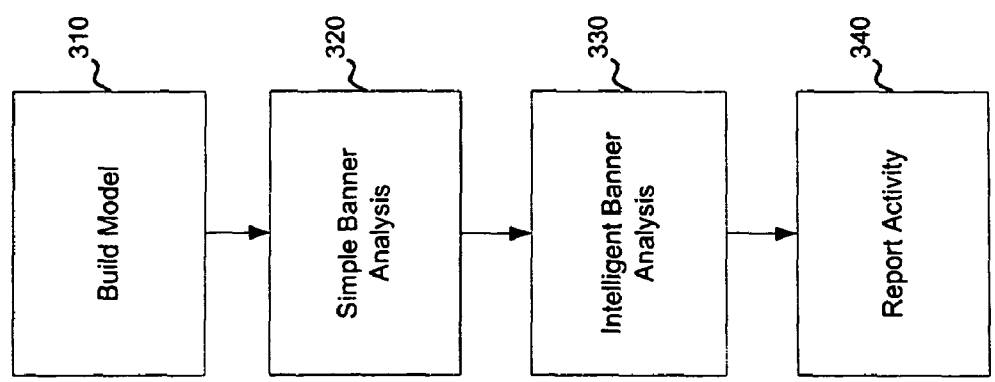
FIG. 3 is a flowchart of a method for passively scanning a network according to a preferred embodiment of the present invention.

FIG. 3 is a flowchart of a method for passively scanning a network according to a preferred embodiment of the present invention. The method described in FIG. 3 could be performed at periodic intervals or it could be performed continuously.

In steps 310 and 320 of method 300, a passive scanner sniffs packets in a packet stream and builds a model of active hosts and services. Particularly, as the passive scanner observes network packets, it builds a model of the active hosts on a network and the services running on each active host.

In general, all network devices can be characterized as two types: servers and clients. Those network devices that provide services (like Web servers or File Transfer Protocol ("FTP") servers) to other machines are servers, and the network devices that are used to connect to those services are clients. When a user connects to a Web site, such as Google at www.google.com, Google is providing one or more network devices for use on the internet to service the user's request. Google is providing a server, and the user's machine, which probably provides no services to anyone else on the Internet, is a client machine.

Thus, a server machine must make its services available to the Internet using numbered ports, one for each service that is available on the server. In one exemplary embodiment, a server machine may make a Web server available on port 80 and an FTP server available on port 21. A client may connect to a service on a server using a specific IP address and specific port.

In another exemplary embodiment, upon observing a TCP port 25 SYN-ACK packet from one of the monitored hosts, the passive scanner re-evaluates the network model. Particularly, the passive scanner determines whether the identification of a server on part 25 is new information to the model. If the information is new, the passive scanner updates the model. The passive scanner may store the information and update the model at a predetermined time, or it may update the model immediately. Thus, from an analysis of these SYN packets during network usage, the passive scanner determines the existence, status (e.g., whether a host is alive) and identity of an active host.

The passive scanner also uses SYN packets to identify a host's operating system. Each operating system (Linux, Windows XP, Solaris, etc.) builds SYN packets in a manner that is unique from other operating systems. By analyzing the structure of SYN packets, the passive scanner of the present invention may determine an operating system of a host. In this manner, server services are determined using passive techniques.

An additional technique to identify a unique operating system with the passive scanner of the present invention is to perform an analysis of various client applications. For example, web browsers such as Internet Explorer, and email clients such as Eudora, often place operating system information, such a Windows XP, directly into various protocols and this information is readily detected by the passive scanner. The passive scanner may extract this information and identify the operating system.

After recognizing hosts and their operating systems on a network, the passive scanner searches for vulnerabilities on client and server sides.

In step 330 the passive scanner analyzes signatures for vulnerabilities using simple banner analysis. Although the description above in reference to steps 310 and 320 explains passively obtaining server-side information, the passive scanner of the present invention also may be used to obtain client-side information. Notably, in performing a vulnerability analysis, the passive scanner of the present invention listens to data being transmitted across the network and reconstructs both sides (e.g., client and server sides) of a network conversation using information obtained from the transmitted data.

Not only do servers display information, such as versions, of its network services, but clients (such as a web browser) also display a version of a client service being used. Thus, using the passive techniques described above, a host or client side vulnerability analysis also may be created. In contrast, a client-side analysis can only be accomplished in the prior art with a host agent, or configuring an active vulnerability scanner with system credentials so that it can 'log on.'

After reconstructing both sides of a network conversation, the passive scanner analyzes the data for evidence of specific client or server vulnerabilities. Particularly, the passive scanner recognizes vulnerable service banners using signatures. For example, unique client and servers for protocols such as hyper text transfer protocol ("HTTP"), simple mail transport protocol ("SMTP") and file transfer protocol ("FTP") have unique strings which identify the version of the service. A protocol is a pre-defined way that a client and server communicate, such as a service and Web browser. Protocols are often text, and simply describe how the client and server will have their conversation. The HTTP is the Web's protocol, SMTP is used to send text-based information such as e-mail, and FTP is used to download and upload files.

Upon determining a version number of a service, the passive scanner also identifies vulnerabilities associated with that version of software. For example, in a preferred embodiment the software comprising the passive scanner may include a table stored in memory associating various vulnerabilities with a particular service version detected. Alternatively, in another embodiment the scanner may forward service information to another entity, which may recognize the vulnerabilities of the reported service. By performing simple banner analysis in this manner, various client and server protocols can be identified.

However, many of the more complex protocols cannot be determined by simple banner analysis (i.e., matching banner signatures). These more complex protocols, such as domain name system ("DNS") and simple network management protocol ("SNMP"), require several steps and logic to determine the actual version of the underlying service or client. To handle complex protocols, the passive scanner of the present invention in step 330 analyzes signatures using intelligent banner analysis. More particularly, a passive scanner according to the present invention has a signature language that includes multiple regular expression ("regex") styles of pattern matching. Regex macros involve the use of regular expressions which must be written out as a single line of text for them to function as they should. In some cases, knowledge of the protocols being monitored can be used to effectively write signatures. Exemplary signatures are described in more detail with reference to FIGS. 12 through 15.

Thus, the passive scanner of the present invention recognizes vulnerabilities based upon combinations of signatures that match expected patterns in network traffic. The signatures begin with simple or generic matching and become increasingly complex. For example, the passive scanner first may identify "there is a web service at IP 10.20.30.40 on port 80." Then, it may identify "an Apache web server is running on 10.20.30.40 on port 80." Finally, it may indicate a vulnerability such as "on Apache web server at 10.20.30.40, there is version 2.1.3 of Apache which has these vulnerabilities."

After identifying services using simple and/or intelligent banner analysis, the passive scanner of the present invention in step 340 prepares a report of the collected network information. Before preparing or transmitting the report, the passive scanner must observe a number of sessions that meets or exceeds a threshold level before it reports a port as being active. The threshold level is a minimum number of sessions that must occur on a given port for the port to be labeled by the passive scanner as "active." Thus, the threshold level determines a level of sensitivity that directly correlates to false positives and false negatives reported by the scanner. A high threshold level causes the passive scanner to only report services having a high numbers of sessions. In contrast, a low threshold level causes the passive scanner to report every network session.

More particularly, when trying to determine what servers are actually on the network, a user would like to know which ports are available for connection. These ports are normally on well-known ports, such as port 80 for web services. A network service will respond to a "syn" query on an open port with a "syn-ack." The passive scanner of the present invention recognizes this behavior as indicative of a particular network service or host.

However, occasionally some FTP, P2P and chat programs will open a port temporarily on a connection that is not well known. A passive scanner may see this connection on an unknown port and conclude that there is a server on this port. For example, the passive scanner may see a "syn" request followed by a "syn-ack" response and log an entry noting that a server is on this port.

However, the passive scanner of the present invention may be tuned to avoid detecting servers that are only temporary servers. Because the communications established on unknown ports by some P2P and chat programs occur seldom in comparison with a web server having hundreds of connections a second, a threshold may be selected to weed out temporary servers. That is, the passive scanner may be tuned using the threshold to only log those servers having multiple connections to the same port.

In contrast, some users of the passive scanner of the present invention may wish to monitor all server activity, including temporary activity. These users may select a low threshold to receive all detections made by the passive scanner. By allowing a user to select or tune the threshold, the passive scanner of the present invention is a flexible tool for the user to obtain the desired level of sensitivity.

Although FIG. 2 shows a single passive scanner for the entire system 200, a preferred embodiment of the present invention incorporates multiple passive scanners as well as active scanners for performing vulnerability analysis.

Figure 4:
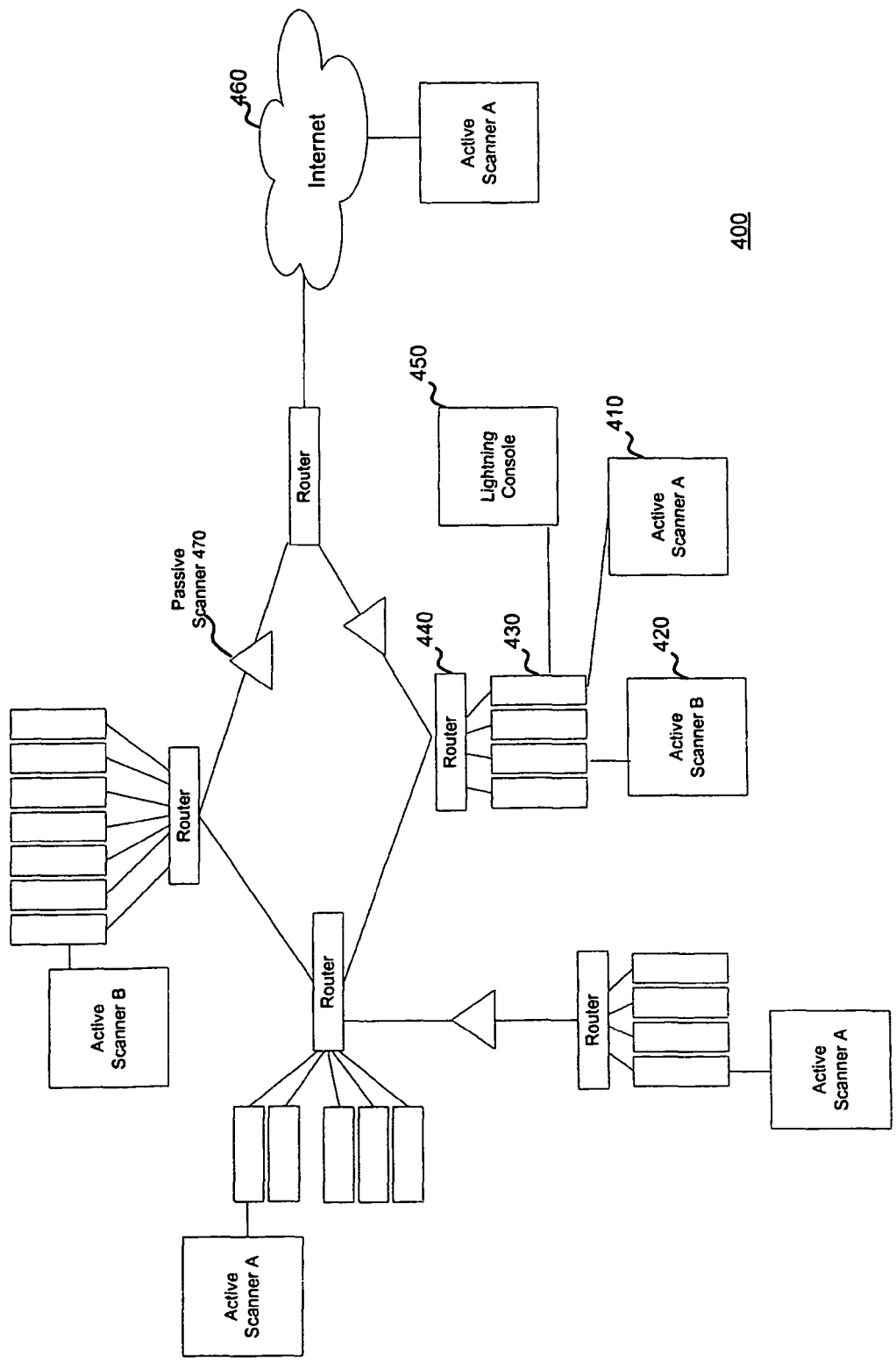
FIG. 4 is a schematic diagram of a network using a passive scanner according to a second preferred embodiment of the present invention.

FIG. 4 is a schematic diagram of a network using a passive scanner according to a second preferred embodiment of the present invention. System 400 includes an active scanner A 410, an active scanner B 420, a network device 430, a router 440, a "Lightning Console" 450, Internet 460, and a passive scanner 470. Particularly, system 400 includes six active scanners 410, 420 and three passive scanners 470, which are managed by a single Lightning Console 450.

Co-pending U.S. patent application Ser. No. 10/863,238, entitled "System and Method for Managing Network Vulnerability Analysis Systems," by Ronald Gula and Renaud Deraison, filed on Jun. 17, 2004, which is incorporated by reference herein, describes a system and method for providing a comprehensive vulnerability analysis system using a Lightning Console, such as Lightning Console 450.

Lightning Console 450 is a software module that allows a security group to organize, distribute, manage and report network security information to multiple users across multiple organizations and to articulate the detected and directed activity to executive management. Console 450 has many powerful features which include extremely robust vulnerability scanning; reporting and scheduling; asset management; real time aggregation of IDS events and correlation with vulnerabilities; tracking the network security remediation process; allowing strong separation of roles and security information; and providing an organizational view of network security. Notably, Lightning Console 450 manages and analyzes data provided by distributed active scanners 410, 420 and passive scanner 470.

Figure 1:
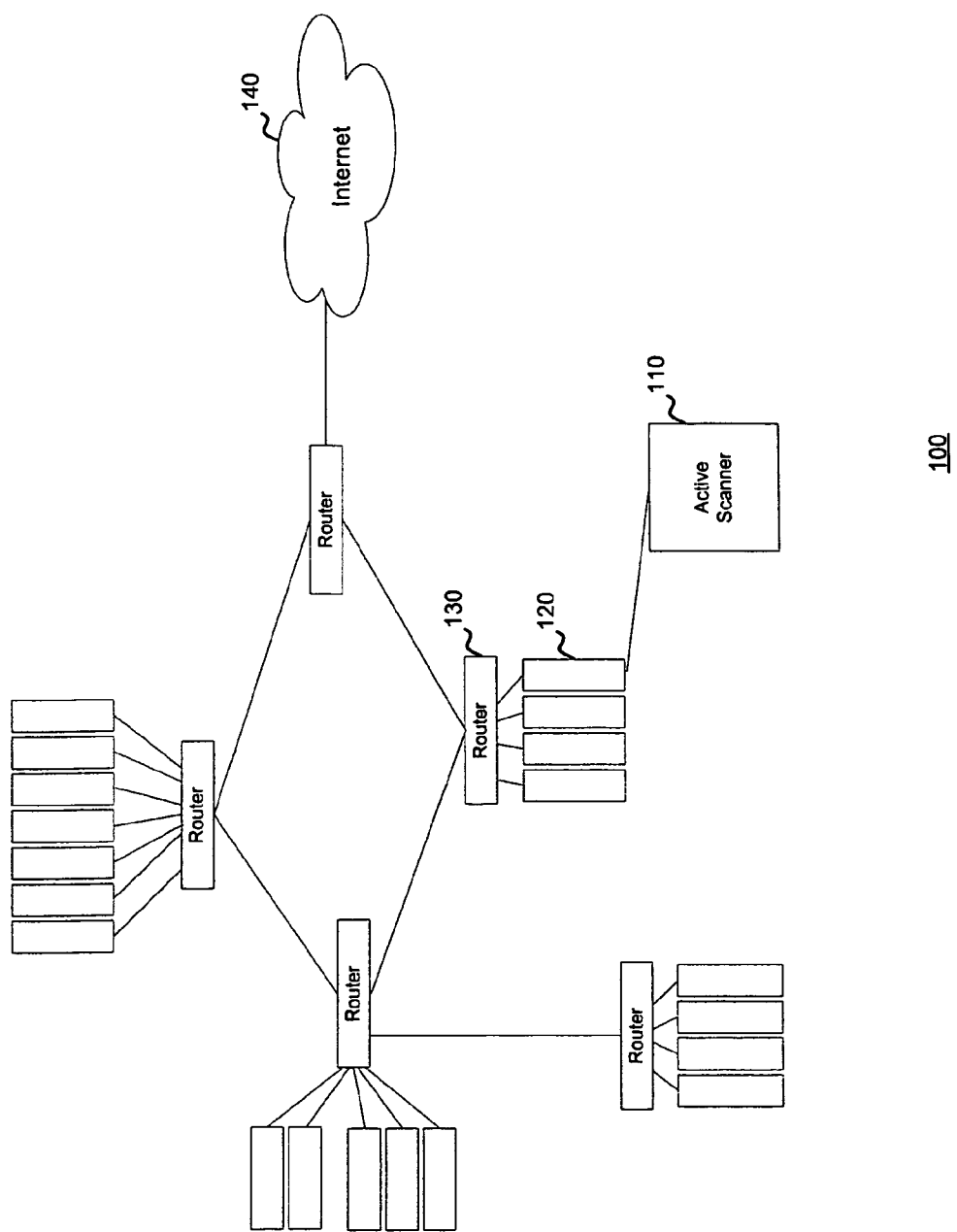
FIG. 1 is a schematic diagram of a conventional active scanning system.

By distributing scanners across the network, scanning system 400 places less stress on the network infrastructure than scanning system 100 of FIG. 1 or scanning system 200 of FIG. 2. In a preferred embodiment of the invention, active scanners 410 and 420 each scan only a portion of the network during an active scan and the various scan operations performed by each of the active scanners occur in parallel with one another. Because the work is divided among the scanners and performed in parallel, the scan time required by system 400 drops significantly from the scan time required by system 100 of FIG. 1 or even system 200 of FIG. 2. Further, because scanners 410 and 420 are distributed throughout system 200, they may be placed closer in distance to their scanned targets 430. By placing the scanners closer to the scanned targets, packets require less time to reach their targets, allowing a further reduction in scan time.

A plurality of passive scanners 470 may operate to update the vulnerability analysis between active scans or to reach networks inaccessible by active scanners 410, 420. A more detailed description of the joint operation of active scanners 410 and 420 and passive scanners 470 is provided below. Each passive scanner 470 may scan only a portion of the network during a passive scan and the various scan operations performed by each of the scanners occur in parallel with one another, thereby allowing for a more efficient scan operation.

Active scanner A 410 and active scanner B 420 are active network scanners, well-known in the prior art. Active scanner A 410 and active scanner B 420 may be the same or different network scanners. Active scanners A 410 and B 420 may include any active scanners that are compatible with Lightning Console 450. In a preferred embodiment of the invention, the scanners comprise a piece of software loaded onto a laptop, computer system or server. For example, active scanners A 410 and B 420 may include active scanners that are available to the public for free (such as Nessus, available from http://www.nessus.org/download.html), active scanners that are complimentary licensed, such as NeWT (available from Tenable Network Security, Columbia, Md.), or active scanners that are professionally licensed, such as NeWT Pro, also available from Tenable Network Security. The scanners may include standard plugins and/or the ability to create customized plugins. In a preferred embodiment, the scanners use Nessus Attack Scripting Language (NASL) script language. Active scanners A and B 410, 420 may operate on Windows XP, Windows 2002 and/or Unix. Nessus, for example, works on Unix-compatible systems (MacOS X, FreeBSD, Linux, Solaris and more); whereas NeWT and NeWT Pro operate on Windows 2000 and XP. NeWT may act as a Class C scanner to scan a local subnet; whereas, NeWT Pro may provide unlimited scanning.

As briefly mentioned above, in system 400 passive scanners 470 are used jointly with active scanners A and B 410, 420 to obtain a more comprehensive security profile than either type of scanner could provide alone. For example, a limitation in a passive scanner, which limitation an active scanner does not share, includes the passive scanner's dependency on network traffic to detect the existence of a network device or make a conclusion about a vulnerability. A server could be the most vulnerable server in the world; however, passive scanner 470 would not be able to detect it or its vulnerabilities if it did not communicate with other network devices. Thus, an active scanner may obtain information from an inactive or non-communicative host, which a passive scanner cannot obtain, by interrogating the host and awaiting a response. In this manner, the joint function of the active and passive scanners provide a more thorough vulnerability analysis.

Similarly, a limitation of active scanners includes the significant resources and time for completion a single active scan requires. Further, active scans cannot run continuously due to the stress they place on the network, and results may become stale between active scans. Thus, it is desirable to "fill in the gaps" between active scans without burdening the network.

Passive scanner 470 may operate continuously to efficiently detect changes to the monitored networks from the last active scan, thereby filling in the gaps between active scans. Further, with the exception of being placed on a network switch span port, deploying passive scanner 470 has no impact on the monitored network. On the other hand, deploying anything on a switch span port impacts switch performance.

Further, when configured with the Lightning Console 450, passive scanner 470 may be used to alert security and system administrators of network changes and new vulnerabilities between active scans. For example, passive scanner 470 may prepare a report concerning a new vulnerability it has observed in network traffic since it was last powered on and forward the report to Lightning Console 450. Although passive scanner 470 maintains its own network model of hosts, services and vulnerabilities, it only maintains this model while powered on. For example, a passive scanner 470 that is turned on today will discover a plethora of "new" hosts that have been on the network for a long time. Further, it may only observe information relating to a subnet of a network. Thus, passive scanner 470 does not conclusively determine what is new. Rather, it constantly records what is active and what is "new" is determined by comparing what is currently active to what was not active some time ago.

Lightning Console 450, which manages all of the scanners in system 400, may compare the report from passive scanner 470 to a master vulnerabilities database and/or master network model that it maintains to determine if the vulnerability is indeed new. If so, Lightning Console 450 may report the new vulnerability immediately to security and system administrators. Similarly, a new server identified by passive scanner 470 may be reported immediately upon receipt at Lightning Console 450.

For example, in the example described above, if a passive scanner is powered on today, it may discover a "new" host at IP address 66.249.64.197 and forward this new information to Lightning Console 450. However, Lightning Console recognizes that IP address 66.249.64.197 is Tara's Office Laptop and not a new host. Accordingly, Lightning Console 450 does not provide this information in an update report to security administrators.

In a preferred embodiment, Lightning Console 450 configures each scanner 410, 420 and 470 to determine not only the area scanned by each scanner and the time of each scan, but also the frequency of reports provided by passive scanner 470. Lightning Console 450 may configure a passive scanner to provide an updated report immediately upon detection of a new network device, service or vulnerability. Alternatively, Lightning Console 450 may configure a passive scanner to provide updated reports at specified periodic intervals.

In a preferred embodiment, the topology and vulnerabilities derived by passive scanner 470 are integrated into the Lightning Console as if they were derived from a conventional active scanner, such as a Nessus scanner. This feature, described in more detail in reference to FIG. 5 allows an organization to conduct active scans less often and have their vulnerability database updated in-between scans by the passive scanner.

Alternatively, or in addition thereto, passive scanners 470 can be used when active scanning is not an option by active scanners A and B 410, 420. For example, a security administrator may not have permission to perform an active scan of a network. Similarly, a network's security or stability requirements may render an active scan impermissible at given instances.

Passive scanners 470 also may be used to detect vulnerabilities in a remote extranet, if the extranet communicates with the network that passive scanners 470 have been installed upon. For example, assume company B, having a network B, is in the process of merging into company A, having a network A. By running passive scanners 470 on the new portions of network A (relating to the merging of network B into network A), company A may detect vulnerabilities on the new portions of network A without actively scanning network B. It can also provide a 'second opinion' or analysis of a security level of a service provider or hosting company.

Further still, passive scanners 470 may be used in application enforcement. Passive scanners 470 have the ability to emit a TCP "RESET" packet when it observes a specific vulnerability or application. By emitting a TCP "RESET" packet, a passive scanner may limit the use of unauthorized clients, servers and specific applications. For example, if the standard corporate web application is Netscape, the passive scanner can be configured to stop any other connections which make use of Microsoft Internet Explorer. Similarly, P2P applications, such as WinMx and eMule, which present a liability to corporate organizations, can be detected and stopped. The passive scanner of the present invention has a signature writing application to detect new P2P applications and abuses, for example.

Figure 5:
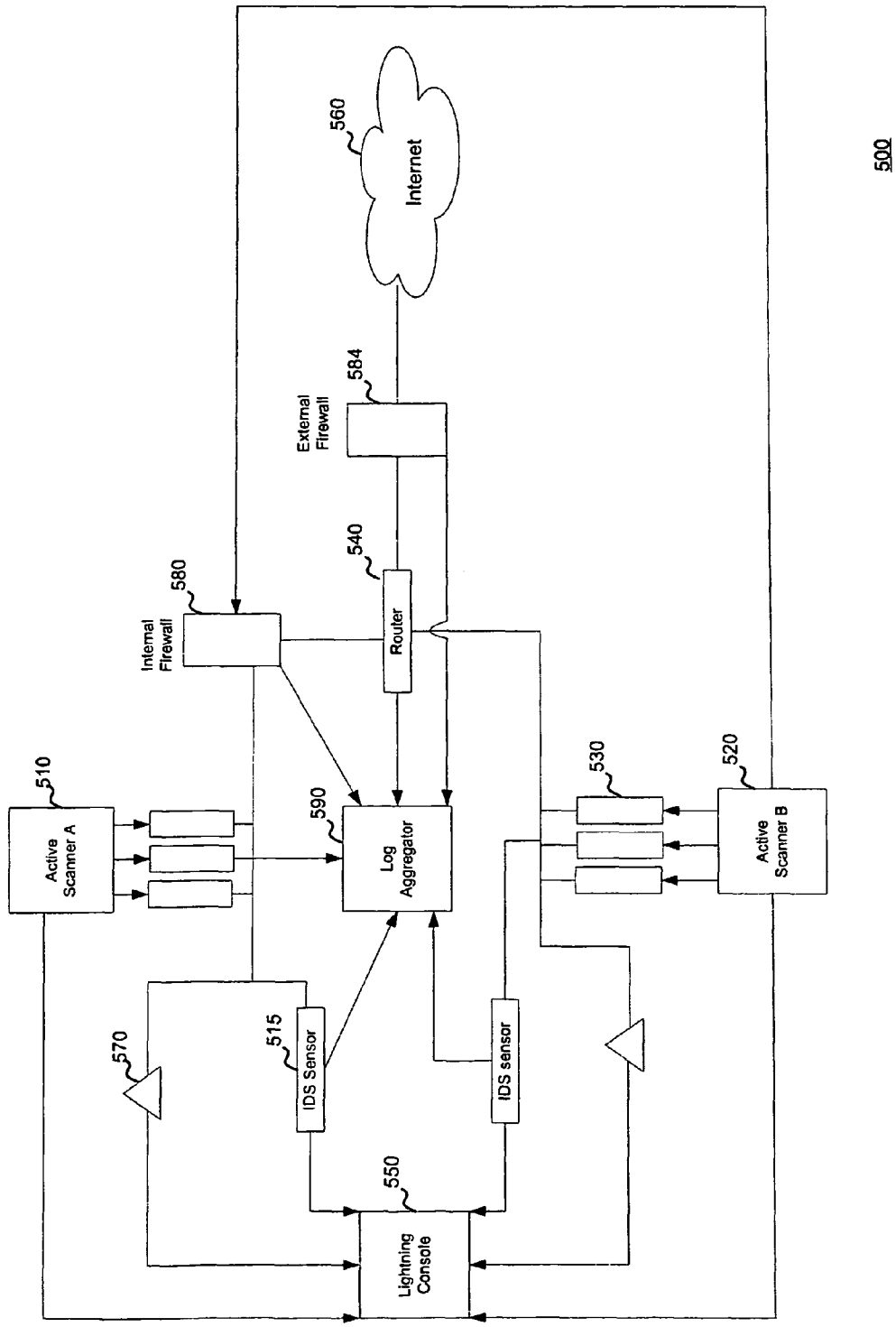
FIG. 5 shows a managed security service system for providing a variety of security functions according to a preferred embodiment of the invention.

FIG. 5 shows a managed security service system for providing a variety of security functions according to a preferred embodiment of the invention. FIG. 5 illustrates more clearly how passive scanners 570, interact within a managed security service system. Managed security system 500 includes a Lightning Console 550, a network intrusion detection sensor ("NIDS") 515, an active scanner A 510, an active scanner B 520, a passive scanner 570, a network device 530, a log aggregator 590, an internal firewall 580, an external firewall 584, a router 540 and a network 560.

Lightning Console 550 scans for a network device 530 using active scanners 510, 520. Active scanners A 510 and B 520 preferably are placed outside internal firewall 580. Passive scanner 570 may scan the network between successive active scans. Alternatively, or in addition thereto, passive scanner 570 may scan for networks or clients that active scanners 510, 520 cannot directly scan.

In an exemplary embodiment, passive scanner 570 is placed within internal firewall 580. In this manner, the passive scanners may provide continuous passive scanning within the network to fill any gaps between active scans without impacting the system or otherwise compromising network stability. Further, by using different scanners (e.g., active and passive) and placing the scanners at different points in the network, the Lightning Console 550 may gain a more complete picture of the network and its vulnerabilities.

Internal firewall 580 and external firewall 584 may include any suitable firewall. External firewall 584 protects computer systems from outside invasions by network 560, which may include the Internet, for example. Internal firewall 580 may be used to protect or insulate network devices or hosts 530, which may be located in different zones, for example. Internal firewall 580 and external firewall 584 may provide firewall protection using packet filtering, proxy service or stateful inspection or any other method for preventing harmful data from flowing into a network or network device.

Packet filtering, for example, includes using a set of filters to filter out harmful packets. Similarly, proxy service includes retrieving information from the Internet by the firewall and sending the packets to the requesting system, and vice versa. Finally, stateful inspection is a newer method that does not examine the contents of each packet, but rather compares certain key parts of the packet to a database of trusted information. Information traveling from inside the firewall to outside is monitored for specific defining characteristics. Similarly, incoming information is compared to these characteristics. If a comparison yields a reasonable match, the information is allowed through. Otherwise, it is discarded.

As the active and passive scanners 510, 520, 570 conduct scans, they builds a model of the entire network. More particularly, each scanner provides (in the case of active scanners 510, 520) or updates (in the case of passive scanners 570) a report of the devices, services and vulnerabilities it observes in the scanning area to which it is assigned by Lightning Console 550. Each scanner forwards its analysis to Lightning Console 550, which stores, compiles and manages the data for all of the scanners. For example, Lightning Console 550 may create and maintain a database in memory relating to a network model or topology and each vulnerability in system 400.

Figure 6:
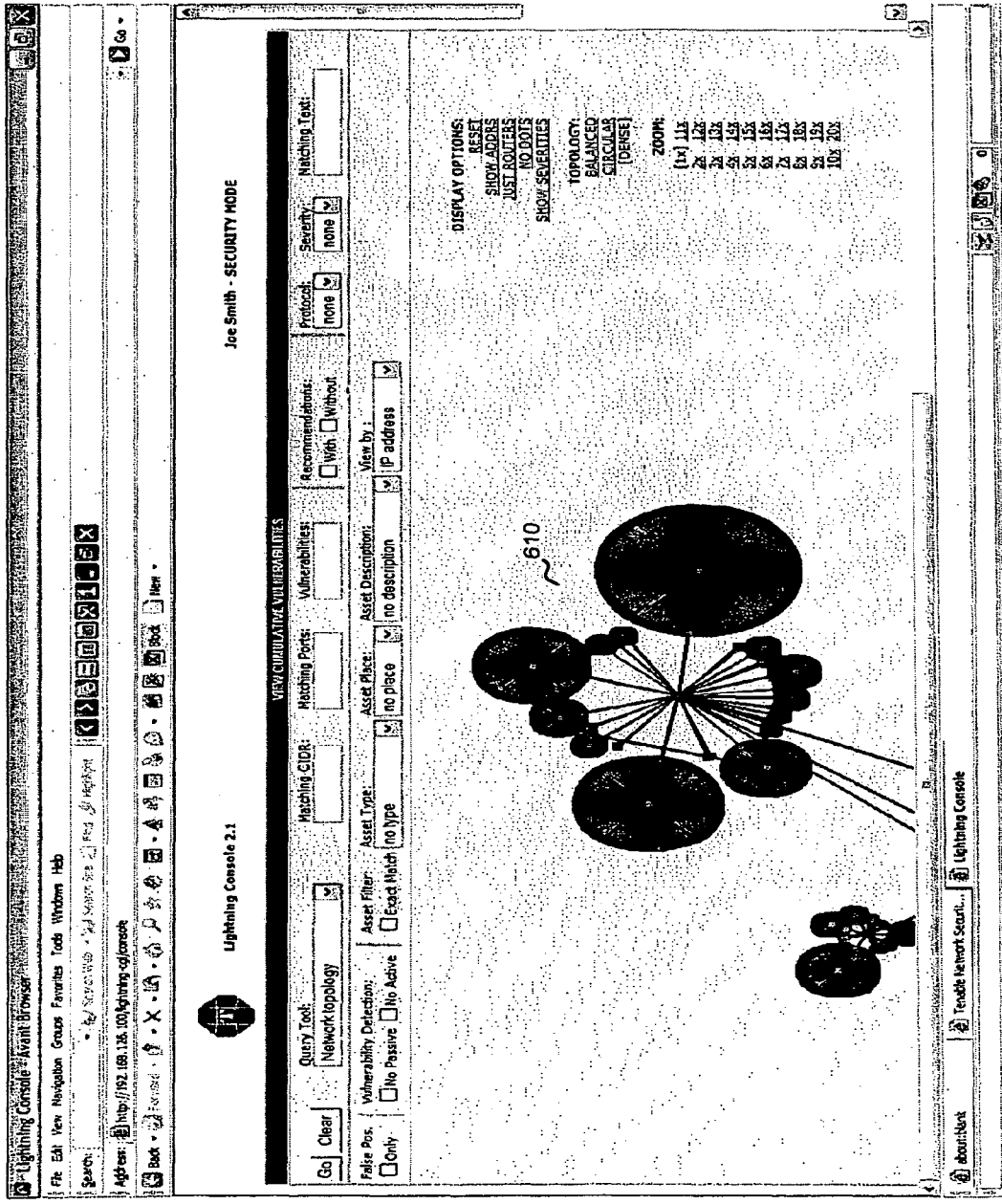
FIG. 6 shows an exemplary network topology created by data from active and passive network scans according to a preferred embodiment of the present invention.

FIG. 6 shows an exemplary network topology created by data from active and passive network scans according to a preferred embodiment of the present invention. Lightning Console 550 directs scanners 510, 520 and 570 to perform network scans and then creates a network topology 610 from the data provided to Lightning Console 550 by scanners 510, 520 and 570. A vulnerability log of the known vulnerabilities detected by the scanners also is created, stored and maintained by Lightning Console 550.

Once the network model is built by Lightning Console 550, it may be used for correlation with incoming, real-time intrusion events detected by NIDS 515. NIDS 515 detect intrusion events that have managed to invade the network.

In system 500, passive sensors 570 are deployed near alongside NIDS 515. As described with reference to FIG. 2, passive sensors 570 may be deployed much like a NIDS.

However, the passive scanner of the present invention greatly differs from a conventional NIDS. Rather than looking for attacks on network devices, passive scanner 570 focuses on network sessions involving friendly clients. Because it is mostly analyzing friendly sessions to determine vulnerabilities, passive scanner 570 is not concerned about dropping packets (e.g., missing an attack). Accordingly, passive scanner 570 has the flexibility to drop a session when the scanner's resources become taxed. Scanner 570 instead may monitor a similar type of session at a later time when it is less busy. Further, because passive scanner 570 is looking for vulnerabilities and not attacks, passive scanner 570 may monitor several thousands of network sessions at the same time, but each session is logged until completion or the presence of a vulnerability is determined.

In contrast, NIDS 515 needs to make a continuous best effort when it is resource-constrained. For example, each NIDS 515 has a maximum number of sessions it may monitor. When it exceeds the maximum number of sessions, data drops. However, when a NIDS drops information it creates a dangerous situation in which a hacker may slip an attack past it. Unlike passive scanner 570, NIDS 515 does not have the flexibility to ignore a session when it becomes overly burdened.

Further, NIDS 515 also must consider that a hostile attacker may attempt to obscure an attack to avoid NIDS detection while being decoded (and harming) a server. For example, an older NIDS from the 2000-2001 timeframe performs simple pattern matching on web traffic. The pattern matching of this NIDS is not sophisticated enough to realize that a web server also interprets the "/" character as "%2f." By exploiting this weakness of an NIDS, an attacker may launch an attack on a server that remains undetected by an NIDS from this relevant time period.

In contrast, passive scanner 570 has no concern of a client obscuring its identity from the server. It is unlikely that network users, such as clients, would modify data in an effort to hide their identity. Accordingly, passive scanner 570 may have lower processing requirements in this area than NIDS 515.

For each attack NIDS 515 observes, NIDS 515 must log the attack. The amount of data logged is determined by the attackers and cannot be predicted by the NIDS operators. Because of this, bursts in traffic or bursts of attacks can overwhelm a NIDS' logging capabilities which leads to dropped attacks and slow performance.

On the other hand, the passive scanner of the present invention does not log anything until it is asked for a report. At that time, passive scanner 570 prepares a report containing its derived model of the network. In a preferred embodiment of the present invention, passive scanner 570 provides the report to Lightning Console 550. However in an alternative embodiment, passive scanner 570 may forward the report to a client, such as a client of a conventional active scanner (e.g., Nessus) that integrates with passive scanner 570. The report generated by passive scanner 570 includes a summary of the data it has detected. Duplicative entries in the report are avoided.

Console 550 may configure passive scanner 570 to prepare reports as frequently or infrequently as desired. Console 550 processes the reports and alerts unique system administrators and security staff when new vulnerabilities, servers and services are discovered.

NIDS 515 may perform its own vulnerability detection when evaluating a signature in search of potential attacks, which may enhance its functionality and reduce false positives. However, any vulnerability detection performed by NIDS 515 is ancillary to its function as an intrusion detection sensor. NIDS 515 is not designed to look for vulnerabilities and has many shortcomings as a vulnerability detector. For example, a NIDS searching for a vulnerability in the form of a particular banner repeats an alert over and over, for each network session containing the banner. In contrast, as described above, the passive scanner of the present invention only provides reports when requested.

The intrusions or security events detected by NIDS 515, which may be countless, are logged by log aggregator 590. Co-pending U.S. Provisional Patent Application No. 60/637, 753, entitled "Methods and Systems for Managing Events," by Ronald Gula, Renaud Deraison, and Matthew Hayton, filed on Dec. 22, 2004, which is incorporated by reference herein, describes a system and method for providing a comprehensive aggregation of intrusion or security events using a Thunder Console, such as log aggregator 590.

Log aggregator 590 manages security events from a variety of security devices. In this way, log aggregator 590 stores generic security events from firewalls 580, 584, intrusion detection sensors 515, routers 540, etc. In addition, Lightning Console 550 also may store the intrusion events, so that it contains a record of both the vulnerabilities and the intrusion events for system 500.

In a preferred embodiment of the invention, Lightning Console 550 supports SYSLOG and SNMP trap analysis of IDS events from Snort (http://www.snort.org), ISS RealSecure (http://www.iss.net), Enterasys Dragon (http://www.enterasys.com) and the Bro IDS (http://www.icir org/vern/bro.html). These IDS solutions may be configured to send SNMP or SYSLOG events directly to Lightning Console 550. For IDS signature date, the Lightning Console is configured to directly access the Internet or support sites of these supported solutions. Providing direct access to Internet support sites allows Console 550 to build a current reference model for all the signature events checked by Console 550 for the IDSs 515 being monitored.

Log aggregator 590 provides security event management and real-time analysis and normalization. Particularly, in the embodiment depicted in FIG. 5, log aggregator 590 receives data from IDS sensors 515, network devices 852, internal firewall 580, and router 540. Although the embodiment of FIG. 5 depicts log aggregator 590 as receiving data from a subset of network devices, one of ordinary skill in the art will recognize that log aggregator 590 is not limited to such an arrangement. For example, log aggregator 590 may receive data from all network devices or from any other variation of selected network devices. For example, log aggregator 590 also may receive information from external firewall 584.

Log aggregator 590 then normalizes the data and analyzes it in real-time. In one embodiment, log aggregator 590 may provide the data as a function of the number of events over time. Spikes in the number of events may indicate a problem in security, for example. In a preferred embodiment, log aggregator 590 supports hundreds of devices.

Lightning Console 550 may correlate the intrusion events detected by IDS sensor 515 with the known vulnerabilities of the system mapped during scanning operations. In this manner, the Lightning Console may correlate attacks which target network hosts or devices with the actual vulnerabilities on that host or device to define a high priority event. A high priority event includes any IDS event or intrusion which targets a service or device that is vulnerable to the attack. At a simplistic level, it would make sense to ignore UNIX attacks that were targeted against a Windows 2000 machine and vice versa. On a tactical level, if Lightning Console 550 can correlate a specific IDS event with a specific existing vulnerability, that IDS event is flagged as a vulnerable event. There is no guarantee that the attack will succeed, and there is no guarantee that 100% of all IDS events can be correlated with a vulnerability, but the correlation helps to identify high priority events.

In a preferred embodiment, the correlation is done by matching CVE (http://cve.mitre.org) and Bugtraq (http://www.securitvfocus.com) IDs with plugin information from the vulnerability scanners, allowing for a high-speed vulnerability correlation process. Rather than simply using dictionary look-ups for performing the correlations, in another preferred embodiment of the present invention, Bayesian pattern matching may be used to increase the correlation of IDS events with vulnerabilities.

In a preferred embodiment, passive scanners 570 and active scanners 510, 520 are distributed across a network. By distributing the scanners, each scanner may reduce its workload, thereby reducing the time required in performing an active scan. For example, a network having five active scanners 510 and 520 may place a scan request to Lightning Console 550 requesting that each active scanner perform a distributed scan. In this case, one fifth of the entire scan task may be assigned to each active scanner.

FIGS. 7 to 11 provide exemplary illustrations of a system utilizing a single passive scanner according to a preferred embodiment of the present invention. More particularly, FIGS. 7 to 11 are screenshots created by Lightning Console from the output of one passive scanner to more clearly illustrate features of the present invention.

Figure 7:
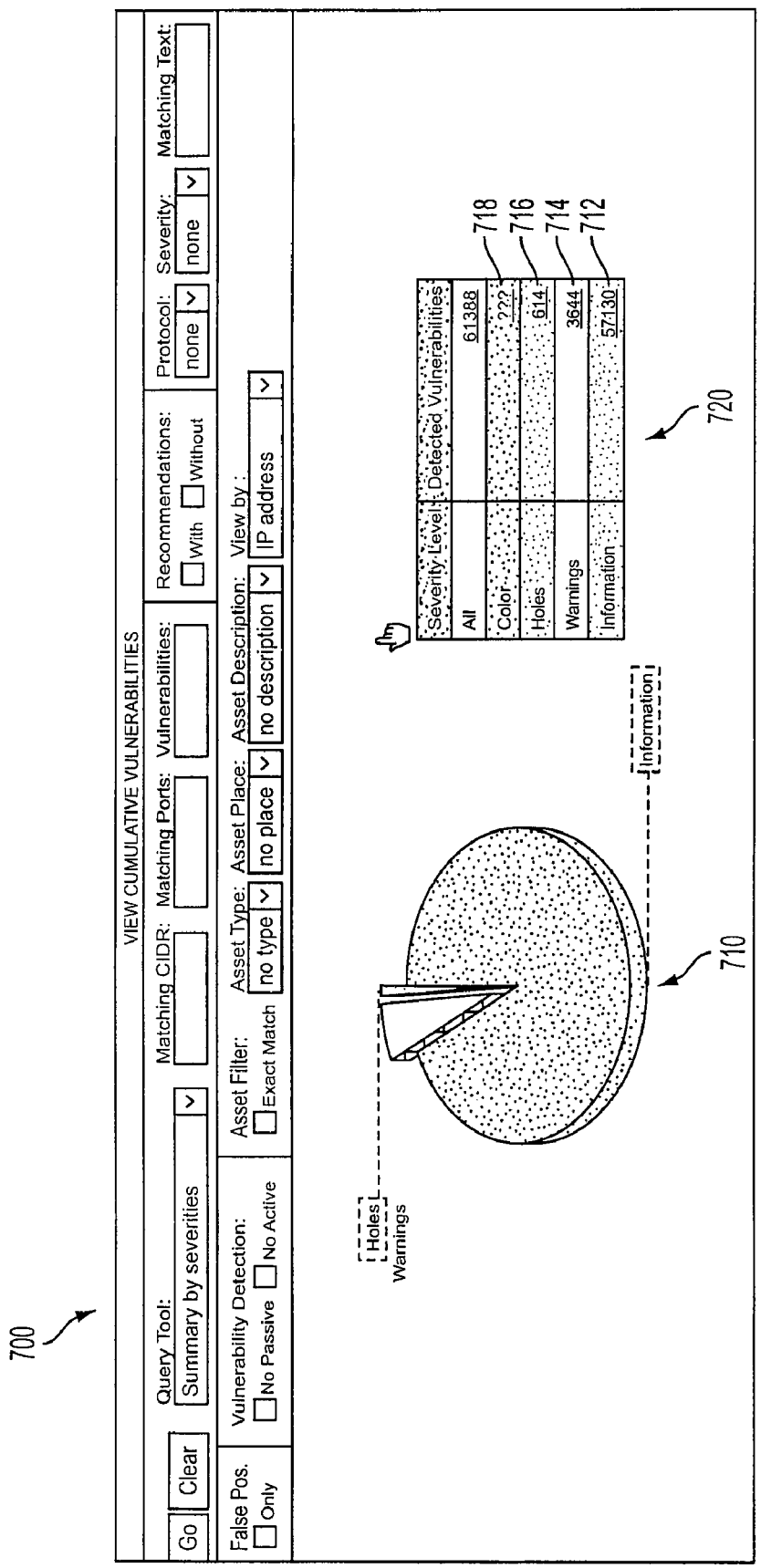
FIG. 7 is a screen shot of vulnerabilities detected by a single passive scanner according to a preferred embodiment of the present invention.

FIG. 7 is a screen shot of vulnerabilities detected by a single passive scanner according to a preferred embodiment of the present invention. Screenshot 700 includes a diagram 710 classifying the types of vulnerabilities according to a severity levels and a table 720 indicating the total number of vulnerabilities in each severity level.

In this example, table 720 shows the passive scanner detected a total of 61,388 vulnerabilities. The majority of vulnerabilities (i.e., 57,130) were at the severity level of "informational," having the lowest severity level. In contrast, none of the 61,388 vulnerabilities were at the highest severity level of "critical."

Particularly, all vulnerabilities are classified as informational 712, as warnings 714, as holes 716 or as critical 718. An informational vulnerability 712 includes detected open ports, types of operating systems and running remote procedure call ("RPC") services. A warning 714 is a security vulnerability which may be used to compromise a system, but is not trivial to compromise. In some cases, a security vulnerability may be labeled as a warning, because the information obtained from the exploit is of little value. A hole 716 is easily exploitable and represents significant risk to the system of remote compromise. A critical vulnerability 718 may include detected vulnerabilities that have been targeted for an attack as recorded by a NIDS.

To identify the vulnerabilities shown in FIG. 7 using an active scanner would require several hours of downtime. Further, performing an active scan would require extensive planning and coordination between a security staff and a networking administrator.

FIG. 8 is a screen shot of unique IP addresses detected by a single passive scanner according to a preferred embodiment of the present invention. Screenshot 810 includes a total number of matching IP addresses. Here, the passive scanner detected the existence of 11,389 IP addresses through passive analysis.

Figure 9:
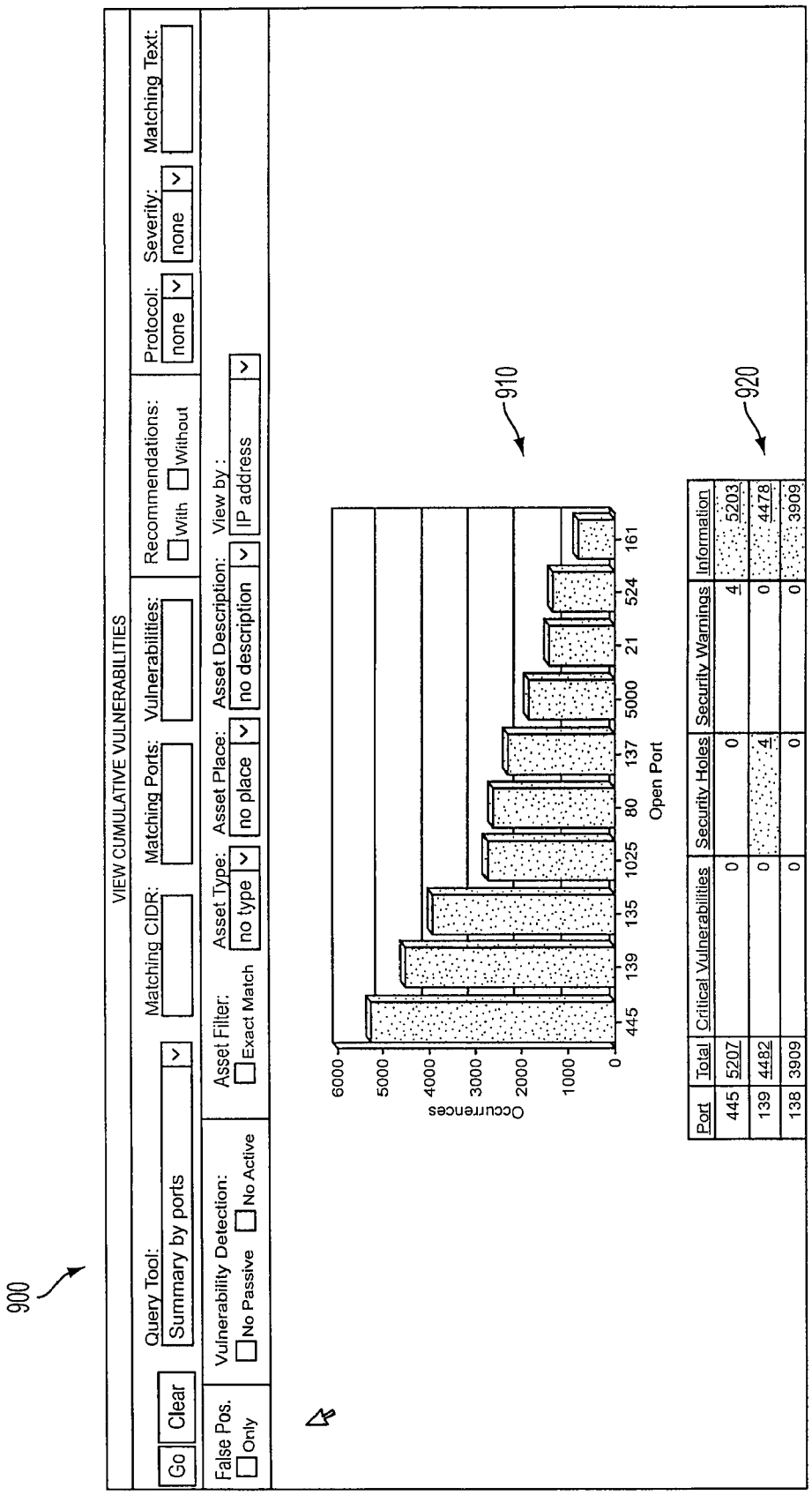
FIG. 9 is a screen shot of cumulative vulnerabilities for open ports according to a preferred embodiment of the present invention.

The passive scanner of the present invention also monitors active hosts, the ports they use and the applications they run. FIG. 9 is a screen shot of cumulative vulnerabilities for open ports according to a preferred embodiment of the present invention. Screenshot 900 includes a diagram 910, classifying the number of vulnerabilities according to an open port, and a table 920, indicating the total number of vulnerabilities in each severity level at each open port. For example, 5207 vulnerabilities were detected at open port 445. All of the vulnerabilities at open port 445 were informational vulnerabilities, which have the lowest severity level.

In contrast, open port 139 had four vulnerabilities classified at the severity level of "holes." As described above, security holes are vulnerabilities having the second highest severity level.

FIG. 10 is a screen shot of operating systems detected by the passive scanner according to a preferred embodiment of the present invention. Screenshot 1000 includes a diagram classifying operating systems that are actively detected 1010 and a diagram classifying systems that are passively detected 1020. Because only a single passive scanner is used in this example, no operating systems are listed in the actively detected diagram 1010. However, the Lightning Console described herein is capable of managing a plurality of active and passive scanners distributed across a network.

Passively detected diagram 1020 shows numerous operating systems passively fingerprinted. For example, 2888 instances of a group of Microsoft Windows 2000 Server Pack 4, Microsoft Windows XP Home Edition Service Pack 1, Microsoft Windows XP Home Edition and Microsoft Windows 2000 Server is detected.

Figure 11:
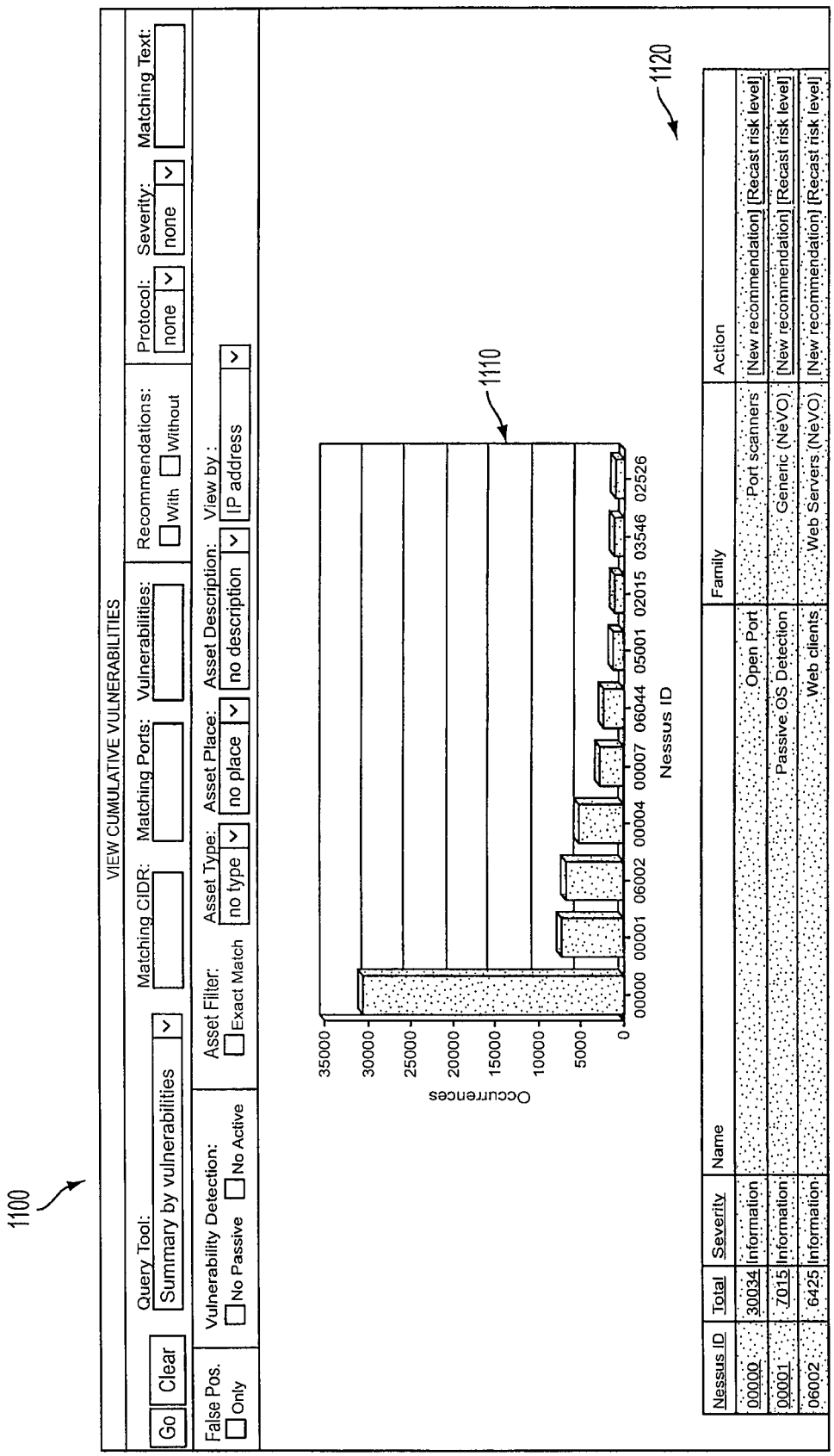
FIG. 11 is a screen shot of passively detected vulnerabilities identified with an active scanner identification number according to a preferred embodiment of the present invention.

In a preferred embodiment of the present invention, vulnerabilities detected by a passive scanner are assigned an identification number associated with an active scanner. FIG. 11 is a screen shot of passively detected vulnerabilities identified with an active scanner identification number according to a preferred embodiment of the present invention. Screenshot 1100 includes a diagram 1110, classifying the number of vulnerabilities according to a Nessus ID, and a table 1120, indicating the total number of vulnerabilities and severity level for each Nessus ID. In this example, the passive scanner passively detected 30,034 open port vulnerabilities. Even though Nessus is a type of active scanner, a Nessus ID of "00000" is assigned to the 30,034 open ports detected by the passive scanner. By correlating the types of vulnerabilities detected by each type of scanner, the Lightning Console can manage dozens of passive and active scanners.

FIGS. 12 to 15 provide some exemplary signatures used by the passive scanner in accordance with the present invention.

FIG. 12 is a basic exemplary signature analyzed by a passive scanner according to a preferred embodiment of the present invention. Signature 1200 includes the following fields: id 1210, nid 1220, hs_sport 1230, name 1240, description 1250, match 1260 and regex 1270. Id 1210 is a unique number assigned to this plugin. Nid 1220 is a Nessus ID of a Nessus NASL script corresponding to the Id 1210. Although this example provides a correlation between a passive scanner and a Nessus scanner, one of ordinary skill in the art will recognize that the passive filter can be correlated with another active scanner in accordance with the present invention.

Hs_sport 1230 is a source port to key on when a high-speed mode is enabled. Name 1240 is the name of the plugin. Description 1250 is a description of the problem or service being detected by the passive scanner. Here, description 1250 indicates that the passive scanner is searching for an IMAP server running on port 143.

Description 1250 further includes a macro "% L." The "% L" macro instructs the passive scanner to store an evaluated regular expression regex 1270 in % L and printed when the report is generated.

Match 1260 is the set of match patterns the passive scanner must find in the payload of the packet before it evaluate the regular expression. Here, there are three match patterns: (1) match=OK, (2) match=IMAP and (3) match=server ready. The three match patterns must be found by the passive scanner in the payload of the packet before evaluating the regular expression, regex.

Regex 1270 is the regular expression to apply to the packet payload. In this case, regex=^.*OK.*IMAP.*server ready. Thus, the set of match patterns the scanner must find in the payload of the packet before evaluating this regular expression is "OK," "IMAP" and "server ready."

In addition, knowledge of the protocols being monitored can be used to write signatures. The match pattern can make use of various symbols, such as ">," "^" and "!" For example, the symbol ">" indicates that the subsequent string must be at the beginning of a packet payload. The "^" symbol indicates that the subsequent string must begin at least one line in the packet payload. Finally, the "!" symbol indicates that the subsequent string must not match anything in the packet payload.

Because the '^' symbol is more expensive to evaluate than the '>' symbol, in a preferred embodiment of the present invention the '^' symbol should be used when searching for an occurrence of a string at the beginning of a line, but not when searching for an occurrence at the beginning of the packet payload. In the latter case, the '>' character is preferably used instead.

The passive scanner of the present invention allows matching on patterns in the current packet as well as patterns in the previous packet in the current session. FIG. 13 is an exemplary signature for analyzing previous packets by a passive scanner according to a preferred embodiment of the present invention. Signature 1300 includes description 1350, pmatch 1355, match 1360 and regex 1370. Description 1350 indicates that the passive scanner is searching for a Unix password file that was sent by a remote web server in response to a <br>% P<br>request.

Match 1360 includes match patterns that apply to a current packet in a session. The match patterns for signature 1300 include a root entry in a UNIX password file. In contrast, pmatch 1355 includes match patterns that apply to a packet captured immediately before a current packet in a current session. In this example, pmatch 1355 includes a match pattern that matches against a packet that makes an HTTP GET request to a web server. Accordingly, pmatch 1355 causes the passive scanner to look at a packet that was captured immediately before the current packet in a session to obtain an HTTP GET request by a client to a web server located at port 80. Meanwhile, match 1360 causes the passive scanner to look at the current packet from a web server at port 80 to a client to obtain the contents of the password file that was previously requested by the client.

The passive scanner of the present invention allows matching against binary patterns. FIG. 14 is an exemplary signature for analyzing binary patterns by a passive scanner according to a preferred embodiment of the present invention. Signature 1400 includes a name 1410, a description 1420 and a bmatch 1430. Name 1410 and description 1420 indicate that signature 1400 makes use of binary pattern matching to detect the usage of the well known community string "public" in SNMPv1 response packets.

Bmatch 1430 is the set of binary match patterns the passive scanner searches for in the payload of the packet. Binary match pattern "bmatch=>2:020100", for example, matches any packet containing the string 0x020100 in hex starting at its second byte. Similarly, binary match pattern "bmatch=020100020100" matches any pattern containing the hex string "020100020100."

Other forms of binary match patterns (not shown in signature 1400) include a form bmatch=[<>[off]:]<hex>. For binary match patterns of this form, the binary match starts at <off>'th offset of the packet or at the last <offset> of the packet, depending on the use of> (start) or <(end). <hex> is a hex string that the passive scanner looks for.

Similarly, a binary match pattern of the form "bmatch=<:ffffffff" (not shown in signature 1400), causes the passive scanner to match any packet whose last four bytes are set to 0xFFFFFFFF.

FIG. 15 is a signature for analyzing time-dependent patterns by a passive scanner according to a preferred embodiment of the present invention. Signature 1500 includes pmatch 1520, 1540, match 1530, 1550, keyword "NEXT" 1560, dependency 1570 and time-dependency 1580. Signature 1500 uses time dependent plugins to detect an anonymous FTP server. NEXT 1560 is used to separate plugins in the plugin file.

Notably, the first plugin of signature 1500 has an id "700018." The second plugin of signature 1500 has an id "700019." Further, plugin 700019 has a dependency 1570 of "700018," which indicates that the plugin 70018 must evaluate successfully before plugin 70019 may be evaluated. That is, plugin 700019 depends on plugin 700018's success before it may be evaluated.

Plugin 700018 includes pmatch 1520 and match 1530. Pmatch 1520 includes match patterns that apply to a packet captured immediately before a current packet in a current session. In this example, pmatch 1520 is a match pattern "^USER ftp" and match 1530 is a match pattern "^331."

After plugin 700018 successfully executes, plugin 700019 operates by executing pmatch 1540 and match 1550. Pmatch 1540 is a match pattern "^PASS," and match 1550 is a match pattern "^230 ."

Thus, signature 1500 executes to identify a traffic pattern in which an FTP client sends a pattern "USER ftp" to an FTP server. In response, the FTP server sends a string including the pattern "331" to the FTP to indicate that the guest login 331 is okay. For example, the FTP server may respond with a string, "331 Guest login OK. Please give your email address as password." The FTP client responds to the FTP server with a string including the pattern "PASS." For example, the FTP client may supply his e-mail address after the command "PASS" as a password for logging onto the FTP server. After receiving the password, the FTP server responds with a string including "230." For example, dialog from the FTP server may indicate "230 Logged in."

Thus, in the current pattern searches a previous packet from an FTP client to a FTP server for the pattern "^USER ftp." Match 1530 searches a current packet in the session that is subsequent to pmatch 150 for the string "^331."

To ensure that both plugins are evaluating the same session, time-dependency 1570 of plugin 700019 determines a maximum time permitted between execution of the two plugins. Here, time-dependency 1570 is 5 seconds, indicating that plugin 700018 must have been evaluated successfully in the last 5 seconds for 700019 to be evaluated.

In summary, the passive scanner of the present invention evaluates vulnerabilities that it passively detects by observing network traffic. Because the scanner is passive and does not interrogate devices on the network, the passive scanner has no impact on the network. It can be operated continuously and used to detect client side vulnerabilities, as well as server side vulnerabilities and devices. The passive scanner of the present invention can be integrated with a managed security system, such as Lightning Console, to provide a comprehensive security analysis. Further, the topology and vulnerabilities derived by the passive scanner are integrated with Lightning Console as if they were derived from a conventional active scanner, such as a Nessus scanner.

The foregoing disclosure of the preferred embodiments of the present invention has been presented for purposes of illustration and description. It is not intended to be exhaustive or to limit the invention to the precise forms disclosed. Many variations and modifications of the embodiments described herein will be apparent to one of ordinary skill in the art in light of the above disclosure. The scope of the invention is to be defined only by the claims appended hereto, and by their equivalents.

What is claimed is:

1. A method for passively scanning a network, comprising:
   distributing a passive scanner configured to observe network traffic on the network, wherein the network traffic includes one or more network sessions between at least one client network device and at least one server network device on the network;
   dropping, by the passive scanner, one or more of the network sessions in response to resources associated with the passive scanner being taxed;
   sniffing, by the passive scanner, a plurality of packets traveling across the network, wherein:
   in response to determining that the resources associated with the passive scanner are not being taxed, the plurality of sniffed packets are associated with the one or more network sessions between the at least one client network device and the at least one server network device, and in response to determining that the resources associated with the passive scanner are being taxed, the plurality of sniffed packets are associated with one or more subsequent network sessions that are substantially similar to the dropped network sessions in response to the resources associated with the passive scanner no longer being taxed;

reconstructing, by the passive scanner, the one or more network sessions or the one or more subsequent network sessions from information in the plurality of sniffed packets;

building a topology of the network from the reconstructed network sessions, wherein the topology of the network includes the at least one client network device, the at least one server network device, at least one service running on the at least one client network device, and at least one service running on the at least one server network device;

analyzing, by the passive scanner, the information in the plurality of sniffed packets to determine a version of the service running on the at least one client network device and a version of the service running on the at least one server network device;

identifying, by the passive scanner, one or more vulnerabilities associated with the version of the service running on the at least one client network device or one or more vulnerabilities associated with the version of the service running on the at least one server network device; and preparing, by the passive scanner, a report containing the identified vulnerabilities and the topology of the network.

2. The method of claim 1, wherein analyzing the information in the plurality of sniffed packets to determine the versions of the services running on the client network device and the server network device includes applying one or more signatures to the information in the plurality of sniffed packets, and wherein the vulnerabilities are identified in response to recognizing one or more vulnerable service banners in at least one of the plurality of sniffed packets using the applied signatures.

3. The method of claim 1, wherein reconstructing the one or more network sessions or the one or more subsequent network sessions includes identifying the server network device in response to the information in at least one of the plurality of sniffed packets including a SYN-ACK response from the server network device.

4. The method of claim 1, wherein the report is prepared in response to a number of the reconstructed network sessions equaling or exceeding a minimum number of network sessions.

5. The method of claim 1, wherein the method is performed continuously and has substantially no impact on the network.

6. The method of claim 1, further comprising emitting, by the passive scanner, one or more TCP RESET packets to stop subsequent traffic on the network from using the version of the service associated with the identified vulnerabilities.

7. The method of claim 1, further comprising assigning one or more identification numbers associated with an active scanner to the identified vulnerabilities, wherein the report further contains the identification numbers assigned to the identified vulnerabilities.

8. The method of claim 1, further comprising identifying, by the passive scanner, one or more vulnerabilities in a remote extranet that communicates with the network from the information in the plurality of sniffed packets.

9. The method of claim 1, wherein the passive scanner is distributed within an internal firewall on the network.

10. The method of claim 1, wherein the identified vulnerabilities are classified as one or more of informational vulnerabilities, warnings, holes, or critical vulnerabilities.

11. The method of claim 2, wherein at least one of the signatures includes one or more patterns that are applied to the information in the plurality of sniffed packets, one or more regular expressions that are applied to the information in the plurality of sniffed packets in response to the information in the plurality of sniffed packets matching the one or more patterns, and a macro that instructs the passive scanner to store an evaluation of the regular expressions in response to the information in the plurality of sniffed packets matching the one or more patterns.

12. The method of claim 11, wherein the one or more patterns are applied to the information in two consecutive packets within the plurality of sniffed packets.

13. The method of claim 11, wherein the one or more patterns include a binary pattern providing a string that is applied to the information in the plurality of sniffed packets.

14. The method of claim 11, wherein the one or more patterns include a time dependent pattern having a first pattern that is applied to the information in the plurality of sniffed packets and a second pattern that is applied to the information in the plurality of sniffed packets in response to the information in the plurality of sniffed packets matching the first pattern in accordance with a predetermined time dependency.

15. A method for detecting vulnerabilities in a network, comprising:

distributing a plurality of active vulnerability scanners on the network;

distributing a plurality of passive vulnerability scanners on the network;

performing a first active scan of the network with the plurality of active vulnerability scanners, wherein each of the plurality of active vulnerability scanners is configured to perform the first active scan for a respective portion of the network;

performing a second active scan of the network with the plurality of active vulnerability scanners after the first active scan, wherein each of the plurality of active vulnerability scanners is configured to perform the second active scan for, the respective portion of the network;

performing a passive scan of the network with the plurality of passive vulnerability scanners for a continuous interval between the first active scan and the second active scan, wherein each of the plurality of passive vulnerability scanners performing the passive scan is respectively configured to:

observe network traffic on the network, wherein the network traffic includes one or more network sessions between at least one client network device and at least one server network device on the respective portion of the network;

drop one or more of the network sessions in response to resources associated with the plurality of passive vulnerability scanners being taxed;

sniff a plurality of packets traveling across the network, wherein:

in response to determining that the resources associated with the plurality of passive vulnerability scanners are not being taxed, the plurality of sniffed packets are associated with the one or more network sessions between the at least one client network device and the at least one server network device, and in response to determining that the resources associated with the plurality of passive vulnerability scanners are being taxed, the plurality of sniffed packets are associated with one or more subsequent network sessions that are substantially similar to the dropped network sessions in response to the resources associated with the plurality of passive vulnerability scanners no longer being taxed; and analyze information in the plurality of sniffed packets to determine a version of a service running on the at least one client network device and a version of a service running on the at least one server network device; and forwarding results from each of the first active scan, the second active scan, and the passive scan to a vulnerability management system that integrates the plurality of active vulnerability scanners with the plurality of passive vulnerability scanners.

16. The method of claim 15, further comprising building, by the vulnerability management system, a topology of the network from the results of the first active scan, the second active scan, and the passive scan, wherein the topology of the network includes a plurality of network devices detected on the network and versions of a plurality of services running on one or more of the network devices detected on the network.

17. The method of claim 16, further comprising identifying, by the vulnerability management system, one or more vulnerabilities associated with one or more of the versions of the services running on the network devices detected on the network from the results of the first active scan, the second active scan, and the passive scan.

18. The method of claim 15, wherein each of the plurality of passive scanners performing the passive scan is respectively further configured to identify one or more vulnerabilities associated with the version of the service running on the client network device or the version of the service running on the server network device in response to one more signatures matching one or more vulnerable service banners in at least one of the plurality of sniffed packets.

19. A method for detecting vulnerabilities in a network, comprising:

distributing a plurality of active vulnerability scanners on the network;

distributing a plurality of passive vulnerability scanners on the network;

performing a first active scan of the network and a second active scan of the network with the plurality of active vulnerability scanners, wherein each of the plurality of active vulnerability scanners is configured to perform the first active scan and the second active for a respective portion of the network;

performing a passive scan of the network with the plurality of passive vulnerability scanners for a continuous interval between the first active scan and the second active scan, wherein each of the plurality of passive vulnerability scanners performing the passive scan is respectively configured to:

observe network traffic on the network, wherein the network traffic includes one or more network sessions between at least one client network device and at least one server network device on the respective portion of the network;

drop one or more of the network sessions in response to resources associated with the plurality of passive vulnerability scanners being taxed;

sniff a plurality of packets traveling across the network, wherein:

in response to determining that the resources associated with the plurality of passive vulnerability scanners are not being taxed, the plurality of sniffed packets are associated with the one or more network sessions between the at least one client network device and the at least one server network device, and in response to determining that the resources associated with the plurality of passive vulnerability scanners are being taxed, the plurality of sniffed packets are associated with one or more subsequent network sessions that are substantially similar to the dropped network sessions in response to the resources associated with the plurality of passive vulnerability scanners no longer being taxed; and analyze information in the plurality of sniffed packets to determine a version of a service running on the at least one client network device and a version of a service running on the at least one server network device;

forwarding results from each of the first active scan, the second active scan, and the passive scan to a vulnerability management system that integrates the plurality of active vulnerability scanners with the plurality of passive vulnerability scanners;

building, by the vulnerability management system, a model of the network from the results of the first active scan, the second active scan, and the passive scan, wherein the model of the network includes one or more vulnerabilities mapped to one or more of a plurality of network devices detected on the network or versions of a plurality of services running on one or more of the network devices detected on the network;

detecting an intrusion event in the network with one or more of the plurality of active vulnerability scanners or one or more of the plurality of passive vulnerability scanners; and correlating the detected intrusion event with the vulnerabilities in the network model to determine whether the detected intrusion event targets the vulnerabilities.

20. A passive scanner for passively scanning a network, comprising:

at least one processing device;

a packet sniffer distributed on the network, wherein the packet sniffer causes the at least one processing device to:

observe network traffic on the network, wherein the network traffic includes one or more network sessions between at least one client network device and at least one sever network device on the network;

drop one or more of the network sessions in response to resources associated with the packet sniffer being taxed; and sniff a plurality of packets traveling across the network, wherein:

in response to determining that the resources associated with the packet sniffer are not being taxed, the plurality of sniffed packets are associated with the one or more network sessions between the at least one client network device and the at least one server network device, and in response to determining that the resources associated with the packet sniffer are being taxed, the plurality of sniffed packets are associated with one or more subsequent network sessions that are substantially similar to the dropped network sessions in response to the resources associated with the packet sniffer no longer being taxed;

a topology builder coupled to the packet sniffer, wherein the topology builder further causes the at least one processing device to:

reconstruct the one or more network sessions or the one or more subsequent network sessions from information in the plurality of sniffed packets; and build a topology of the network from the reconstructed network sessions, wherein the topology of the network includes the at least one client network device, the at least one server network device, at least one service running on the at least one client network device, and at least one service running on the at least one server network device; and a vulnerability processor coupled to the packet sniffer and the topology builder, wherein the vulnerability processor further causes the at least one processing device to:

analyze the information in the plurality of sniffed packets to determine a version of the service running on the at least one client network device and a version of the service running on the at least one server network device;

identify one or more vulnerabilities associated with the version of the service running on the at least one client network device or one or more vulnerabilities associated with the version of the service running on the at least one server network device;

determine which of the identified vulnerabilities contain new information that has not been previously stored and which of the identified vulnerabilities contain duplicative information that has been previously stored;

store the identified vulnerabilities that contain the new information that has not been previously stored in a memory associated with the passive scanner; and prepare a report containing the identified vulnerabilities and the topology of the network.

21. The passive scanner of claim 20, wherein the vulnerability processor further causes the at least one processing device to apply one or more signatures to the information in the plurality of sniffed packets to determine the version of the service running on the client network device and the version of the service running on the server network device, wherein the vulnerabilities are identified in response to the vulnerability processor recognizing one or more vulnerable service banners in at least one of the plurality of sniffed packets using the applied signatures.

22. The passive scanner of claim 20, wherein the topology builder further causes the at least one processing device to identify the server network device in response to the information in at least one of the plurality of sniffed packets including a SYN-ACK response from the server network device.

23. The passive scanner of claim 20, wherein the vulnerability processor further causes the at least one processing device to prepare the report in response to a number of the reconstructed network sessions equaling or exceeding a minimum number of network sessions.

24. The passive scanner of claim 20, wherein the passive scanner operates continuously and has substantially no impact on the network.

25. The passive scanner of claim 20, wherein the vulnerability processor further causes the at least one processing device configured to emit one or more TCP RESET packets to stop subsequent traffic on the network from using the version of the service associated with the identified vulnerabilities.

26. The passive scanner of claim 20, wherein the vulnerability processor further causes the at least one processing device to assign one or more identification numbers associated with an active scanner to the identified vulnerabilities, wherein the report further contains the identification numbers assigned to the identified vulnerabilities.

27. The passive scanner of claim 20, wherein the report further contains information relating to the topology of the network that has not been previously reported.

* * * * *